United States Patent Office 2,816,872
Patented Dec. 17, 1957

2,816,872

MOLDING COMPOSITIONS CONTAINING CELLULOSIC FILLER AND METHOD OF MAKING

John A. Yourtee, Fredericksburg, Va., assignor to American Viscose Corporation, Philadelphia, Pa., a corporation of Delaware No Drawing. Application July 31, 1953,
Serial No. 371,715

17 Claims. (Cl. 260—15)

This invention relates to molding compositions. This application is a continuation-in-part of my copending application Serial No. 98,639, filed June 11, 1949, now abandoned.

Molding compositions obtained by treating a filler consisting of regenerated cellulose with a liquid comprising a thermosetting aminoplast resin-forming condensate, and then drying the mass and reducing it to a powder, yield molded objects which are more translucent than objects molded from compositions containing a filler other than regenerated cellulose. However, in practice, considerable difficulty is encountered when it is attempted to dry the liquid-treated regenerated cellulose because the regenerated cellulose is comparatively non-porous and does not completely absorb or take up the liquid regardless of whether the latter is in a viscous, or in a mobile, relatively non-viscous condition, at the time it is mixed with the filler. For example, when regenerated cellulose sheet or other material in the form of chips or clippings is treated with a thinly mobile solution of a potential resin-forming urea-formaldehyde reaction product, the solution is not completely nor uniformly absorbed by and distributed with respect to the filler, and liquid tends to drip out of the mass during drying thereof, which complicates the drying operation. In addition, objects molded from the compositions are brittle and have relatively low strength.

Even more difficulty is encountered if the filler consists of regenerated cellulose powder. The addition of the thermosetting condensate solution to the powder produces a soupy paste which is difficult to dry by the conventional equipment adapted to drying molding compositions. Such pastes require drying in pans with stirring of the mass during the drying operation. Additionally, the use of the regenerated cellulose powder as sole filler for the molding composition has the effect of reducing the translucency of the molded article as compared to the translucency of objects molded from compositions containing a filler consisting of clippings or fragments of regenerated cellulose.

One object of this invention is to provide a filler for thermosetting aminoplast molding compositions which, when impregnated with the resin-forming condensate, with or without a solvent, or with a solution of the resin-forming constituents, completely and uniformly absorbs the liquid to form an impregnated fibrous mass which holds the liquid, in the proportion usually employed, without dripping, thus facilitating drying of the composition by conventional drying equipment. Another object is to provide compositions which can be molded to provide stronger, non-brittle objects having a translucence approaching that of objects molded from compositions comprising a filler consisting of regenerated cellulose, and characterized by a uniform appearance. A further object is to provide a filler, which after impregnation with the resin-forming material, comprises a mass which can be dried rapidly and efficiently, by conventional drying equipment without dripping of the liquid out of the mass, or such seepage of the liquid within the mass as would result in non-uniform distribution of the condensate in the dried product.

These and other objects of the invention are attained by impregnating a filler comprising a mixture of from 10 to 50, preferably about 35, parts of alpha-cellulose, preferably purified alpha-cellulose, and from 50 to 90, preferably about 65, parts of a substance selected from the group consisting of regenerated cellulose water-insoluble, alkali-soluble cellulose ethers and mixtures of two or more members of the group, in any form with a liquid or syrupy thermosetting aminoplast resin condensate in the presence or absence of a solvent, or with the liquid resin-forming constituents, to obtain a mass which after drying at a temperature below the temperature at which the condensate is converted to the infusible, thermoset condition, comprises the filler and the dry, fusible condensate. The mass may then be ground to produce a molding powder. For example, the dried material may be reduced to the desired particle size and density by grinding it in a ball mill, roller mill, or a hammer mill, or by subjecting it to the action of a cutter, and during such grinding or cutting various molding lubricants such as zinc stearate, and/or various coloring materials, curing catalysts, etc. may be incorporated with it.

The term "alpha-cellulose" is meant to include cotton and commercial grades of wood pulp as well as other forms of alpha-cellulose of equal or greater purity derived from these or other sources.

It is preferred to mix the alpha-cellulose with a regenerated cellulose or cellulose ether having a high D. P. (degree of polymerization) i. e., a cellulose which has not been severely degraded, for example, cellulose regenerated from a viscose which has been aged for a time less than the normal aging period, required to produce a viscose having the normal salt (sodium chloride) test value of between 4 and 6, cellulose regenerated from nitrocellulose, or a cellulose ether which has not been subjected to severe hydrolyzing conditions, since the less degraded regenerated cellulose or cellulose ether results in greater strength in objects molded from the molding compositions.

The term "water-insoluble, alkali-soluble cellulose ether" is intended to include such ethers which are insoluble in water but soluble in aqueous alkali solutions of from 1 to 8% concentration at room temperature or at reduced temperature, including simple alkyl ethers (e. g. methyl and ethyl celluloses), carboxyalkyl ethers (e. g. carboxymethyl cellulose), hydroxyalkyl ethers (e. g. hydroxyethyl cellulose), mixed alkyl, hydroxyalkyl ethers (e. g. methyl, hydroxyethyl) cellulose, and ethyl, hydroxyethel cellulose), mixed alkyl, carboxyalkyl ethers (e. g. methyl, carboxymethyl cellulose and ethyl, carboxymethyl cellulose), and the salts of the carboxyalkyl ethers, especially those mentioned above, which contain free hydroxyl groups. The water-insoluble, alkali-soluble cellulose ether may be one which is swellable in water but insoluble therein.

The compositions may be prepared by any of the methods known in the art. For example, the resin-forming syrup may be prepared first, and the filler impregnated with the syrup in a separate operation, or the resin-forming condensate may be formed in situ in the filler by combining or impregnating the filler with the resin-forming constituents in liquid condition.

The temperature at which the mass is dried may vary and will depend upon the particular thermosetting resin-forming condensate or constituents employed. If the filler is impregnated with a condensate formed in a separate step, the condensation may be advanced during the drying but the temperature is controlled so that the resin is not brought to the infusible state. If the filler is impregnated with the liquid resin-forming constituents, or a solution thereof, the condensate is formed in situ in the mass during the drying. In any case, the product comprises the filler impregnated or combined with the resin-forming condensate which is converted to the fully condensed, thermoset condition during subsequent molding or shaping operations performed under heat and pressure.

In addition to the mixture of alpha-cellulose and regenerated cellulose or cellulose ether, the molding composition may contain a minor proportion of one or more other fillers, such as wood flour, asbestos, cotton linters, clay, etc. Coloring materials, such as pigments and dyes, a mold lubricant, a plasticizing agent, other impregnating agents, and a curing catalyst, may be included during the processing, if desired or necessary. In some applications, it may be desirable to include small amounts of one or more modifying agents such as starches, gums, alginates, casein, etc.

The molding compositions of the invention have important advantages as compared to molding compositions in which the filler consists entirely of regenerated cellulose, while retaining to a large degree the desirable characteristics of such all-regenerated cellulose filled compositions, as a result of the conjoint use of the alpha-cellulose and regenerated cellulose or cellulose ether, both the alpha-cellulose and the regenerated cellulose or ether contributing unique properties to the new compositions. As compared to the all-regenerated cellulose filled compositions, the advantages or improvements reside in better absorption of the liquid comprising the resin-forming material, whereby dripping of the liquid is eliminated and drying is facilitated; and improved strength and toughness such that articles formed from the compositions can be drilled or otherwise machined with less likelihood of chipping or cracking. For instance, clean holes may be drilled in buttons or the like with less danger of shattering during the drilling operation.

The advantages associated with the all-regenerated cellulose filled compositions are, to a large extent, present in the new molding compositions, such as greater translucency and colorability, greater density and lower bulk factor, improved flow in the hopper used in conjunction with the molding device, more rapid grinding, and the obtention of sufficient uniformity of distribution when the compositions are ground to comparatively large particle size so that grinding to extremely small particle size is unnecessary.

The following examples will serve to illustrate specific, representative embodiments of the invention, it being understood that these specific examples are not intended to be limitative.

Example I

A mass consisting of 800 parts by weight of urea, 1700 parts of formalin (37% formaldehyde; acidity 0.03–0.4% formic acid), 3 to 10 parts of hexamethylenetetramine, 1 to 3 parts of ammonium benzoate, 390 parts of regenerated cellulose (chipped cellophane) and 210 parts of purified cellulose pulp is mixed in a shredder at a temperature between 25° C. and 45° C. for one hour during which reaction occurs with formation of a resin-forming condensate, and thorough impregnation of the cellophane-alpha-cellulose filler with the condensate is effected. The mixture is placed in a circulating air drier at 60–80° C. and dried to the desired condition of flow as determined experimentally in a suitable mold. During the drying, further reaction occurs between the urea and formaldehyde. The dried material is then reduced to the desired particle size and density by grinding it in a ball mill, and during such grinding zinc stearate, a coloring material, and a curing catalyst is incorporated with it.

Example II

The steps and conditions of Example I were repeated, except that the filler comprising the mixture of regenerated cellulose and alpha-cellulose was mixed in the shredder with a preliminary water-soluble reaction product of 126 parts of melamine with 200 parts of formaldehyde, and a preliminary water-soluble reaction product of 540 parts of urea with 1100 parts of formaldehyde. The resulting, dried composition comprised the filler impregnated with a condensate of a melamine-urea-formaldehyde resin in which the molar ratio of melamine to urea was approximately 1:9.

Example III

The steps of Example I were repeated except that the 390 parts of regenerated cellulose were replaced by 350 parts of a water-insoluble, alkali-soluble hydroxyethyl cellulose ether having 1.2 hydroxyethyl groups per anhydroglucose unit.

Example IV

The procedure of Example II was followed except that the 390 parts of regenerated cellulose were replaced by 410 parts of a water-insoluble but alkali-soluble methyl cellulose having 0.8 methyl groups per anhydroglucose unit.

Example V

A resin-forming condensate is prepared from 600 parts by weight of melamine and 1050 parts by weight of formalin (37% formaldehyde) neutralized with triethanolamine or other suitable base by reacting at the temperature of a boiling water bath until a sample cooled to room temperature and diluted with an equal volume of water shows a precipitate. Two hundred parts of chipped cellophane, 150 parts of a water-insoluble, alkali-soluble hydroxyethyl cellulose, and 100 parts of alpha-cellulose are then added and the whole mass is mixed in a shredder for one-half hour to effect thorough impregnation. The mixture is placed in a circulating air drier at 80° C. and dried. The dried material is then powdered in a ball mill in which small proportions of a zinc stearate, a pigment, and a latent curing catalyst are introduced.

By using dyed or pigmented cellophane, and/or by blending or mixing compositions of dissimilar particle size and flow characteristics, a wide range of artistic and decorative effects may be achieved, from bright, nearly transparent, solid colors to mottles and variegations in a translucent medium.

An additional advantage of the molding compositions of the invention is that the powders obtained by grinding the dried impregnated mass in an ordinary ball mill or the like have, prior to densification by granulation, a low bulk factor (volume of composition/volume of molded objects), which facilitates molding. The density of the powder prior to granulation is close to the density of granulated powders containing a filler consisting of alpha-cellulose, so that, for many purposes, the conventional step of granulating the powder obtained initially may be eliminated. However, the compositions may be granulated, if desired.

Other thermosetting aminoplast resin-forming condensates may be substituted for all or part of the resins employed in the examples, such as the resins obtained by reacting an aldehyde, e. g., formaldehyde, acetaldehyde, benzaldehyde, furfuraldehyde, etc. with the following: thiourea, the reaction products obtained by heating and decomposing dicyandiamide, melamine, or other amino triazines, etc. The molding composition may also contain mixed resins, e. g., urea-melamine-formaldehyde resins, urea-thiourea-formaldehyde resins, etc. The molar ratios between the aldehyde and the other component or components may vary widely and the resins can be prepared by any of the methods known in the art.

The filler content, the composition of the resin (mole ratio of the resin-forming constituents and proportion of minor ingredients) and the processing conditions may be varied. However, in general, the composition will comprise from 60 to 70, preferably about 65, parts of resin-forming component to from 30 to 40, preferably about 35, parts of filler.

The regenerated cellulose or water-insoluble, alkali-soluble cellulose ether may be used in any form. For example, they may be in the form of fragments or chips of sheet or film material, in the form of fibers or threads, for example, scrap or waste from rayon manufacture in the case of regenerated cellulose, or in the form of an unshaped regenerated cellulose gel which has been dried and reduced to particulate condition and is of non-cellular character. Instead of using cellophane or the cellulose ether in the form of chips, the chips may be disintegrated to a powder prior to impregnating them with a resin-forming precondensate or the liquid, resin-forming constituents.

The molding compositions of the invention may be used in molding articles of all kinds, including buttons, novelty articles, toys, ornamental articles, packaging cartons or boxes such as ring boxes, watch boxes, and jewelry boxes, generally, etc.

Since variations and modifications may be made in practicing the invention, without departing from the spirit thereof, it is to be understood that the invention is not to be limited except as defined in the appended claims.

I claim:

1. A molding composition which comprises (1) from 30 to 40 parts of a filler comprising a mixture of from 10 to 50 percent of alpha-cellulose and from 50 to 90 percent of a substance selected from the group consisting of regenerated cellulose, and water-insoluble alkali-soluble cellulose ethers, and (2) from 60 to 70 parts of a dry, fusible, thermosetting resin-forming material consisting of an aminoplast condensate of an aldehyde and a compound selected from the group consisting of urea, thiourea, melamine and mixtures of the compounds in said group.

2. A molding composition as defined in claim 1 wherein the aminoplast is a urea-formaldehyde resin-forming condensate.

3. A molding composition as defined in claim 1 wherein the aminoplast is a melamine-formaldehyde resin-forming condensate.

4. A molding composition as defined in claim 1 wherein the aminoplast is a urea-melamine-formaldehyde resin-forming condensate.

5. A molding composition as in claim 1 wherein the filler comprises a mixture of alpha-cellulose and a water-insoluble, alkali-soluble hydroxyethyl cellulose ether.

6. A molding composition as in claim 1 wherein the filler comprises a mixture of alpha-cellulose and a water-insoluble, alkali-soluble methyl cellulose ether.

7. A molding composition which comprises (1) from 30 to 40 parts of a filler comprising a mixture of from 50 to 90 percent of regenerated cellulose and from 10 to 50 percent of alpha-cellulose, and (2) from 60 to 70 parts of a dry, fusible, thermosetting resin-forming material consisting of an aminoplast condensate of an aldehyde and a compound selected from the group consisting of urea, thiourea, melamine and mixtures of the compounds in said group, said resin-forming material being intimately combined with said filler.

8. A molding composition as in claim 7, wherein the filler is impregnated with a urea-formaldehyde resin condensate.

9. A molding composition as in claim 7, wherein the filler is impregnated with a melamine-formaldehyde resin condensate.

10. A molding composition as in claim 7, wherein the filler is impregnated with a melamine-urea-formaldehyde resin condensate.

11. A molding composition containing a filler comprising a mixture of about 65 parts of regenerated cellulose and about 35 parts of alpha-cellulose, said filler being impregnated with a urea-formaldehyde resin-forming condensate.

12. A molding composition containing a filler comprising a mixture of about 65 parts of regenerated cellulose and about 35 parts of alpha-cellulose, said filler being impregnated with a melamine-formaldehyde resin-forming condensate.

13. A molding composition containing a filler comprising a mixture of about 65 parts of regenerated cellulose and about 35 parts of alpha-cellulose, said filler being impregnated with a melamine-urea-formaldehyde resin-forming condensate.

14. A method for making molded objects which comprises intimately combining 30 to 40 parts of a filler comprising a mixture of from 10 to 50 percent of alpha-cellulose and from 50 to 90 percent of a substance selected from the group consisting of regenerated cellulose and water-insoluble, alkali-soluble cellulose ethers with a liquid comprising 60 to 70 parts of a thermosetting resin-forming material consisting of an aminoplast condensate of an aldehyde and a compound selected from the group consisting of urea, thiourea and melamine to obtain a mass comprising the filler impregnated with the liquid and substantially free from liquid which is not intimately combined with the filler, drying the mass to obtain a composition comprising the filler impregnated with the resin-forming material which is in a dry, fusible state, and molding the composition under heat and pressure.

15. A method as in claim 14, wherein the filler comprises a mixture of alpha-cellulose and regenerated cellulose.

16. A method as in claim 14, wherein the filler comprises a mixture of alpha-cellulose and a water-insoluble, alkali-soluble hydroxyethyl cellulose ether.

17. In a molding composition containing from 60 to 70 parts of a dry, fusible, thermosetting resin-forming aminoplast condensate as a binder, said condensate consisting of a condensate of an aldehyde and a compound selected from the group consisting of urea, thiourea, melamine and mixtures of these compounds, and from 30 to 40 parts of a filler intimately mixed with said binder, the improvement which comprises a filler for the molding composition comprising a mixture containing from 10 to 50 percent of alpha-cellulose and from 50 to 90 percent of a substance selected from the group consisting of regenerated cellulose, and water-insoluble, alkali-soluble cellulose ethers.

References Cited in the file of this patent

UNITED STATES PATENTS

| | | |
|---|---|---|
| 1,721,742 | Nash | July 23, 1929 |
| 2,322,566 | D'Alelio | June 22, 1943 |
| 2,367,275 | Haney et al. | Jan. 16, 1945 |
| 2,665,261 | Baker | Jan. 5, 1954 |